(12) United States Patent
Baker, III

(10) Patent No.: US 8,839,549 B2
(45) Date of Patent: Sep. 23, 2014

(54) HOSE HOLDER AND METHOD

(76) Inventor: R. Cle Baker, III, Saint Simons Island, GA (US)

( * ) Notice: Subject to any disclaimer, the term of this patent is extended or adjusted under 35 U.S.C. 154(b) by 486 days.

(21) Appl. No.: 13/232,296

(22) Filed: Sep. 14, 2011

(65) Prior Publication Data

US 2013/0061512 A1 Mar. 14, 2013

(51) Int. Cl.
*A01K 97/10* (2006.01)
*F16L 3/26* (2006.01)
*F16L 3/14* (2006.01)

(52) U.S. Cl.
CPC .... *F16L 3/14* (2013.01); *F16L 3/26* (2013.01)
USPC ............................................. 43/21.2; 248/79

(58) Field of Classification Search
USPC .......................... 43/21.2; 248/79, 75, 77, 534
See application file for complete search history.

(56) References Cited

U.S. PATENT DOCUMENTS

| 2,189,364 | A | * | 2/1940 | Walter | 248/79 |
| 2,602,618 | A | * | 7/1952 | Cohen | 43/21.2 |
| 5,088,666 | A | * | 2/1992 | Lang | 248/87 |
| 5,738,813 | A | * | 4/1998 | Naganawa et al. | 264/130 |
| 7,267,306 | B2 | * | 9/2007 | Eason et al. | 248/53 |
| 7,578,486 | B1 | * | 8/2009 | Taylor | 248/75 |
| 7,744,043 | B2 | * | 6/2010 | Otinger | 248/75 |
| 8,220,758 | B2 | * | 7/2012 | Czajor | 248/68.1 |
| 8,408,501 | B2 | * | 4/2013 | Noyes et al. | 248/75 |
| 8,540,196 | B1 | * | 9/2013 | Hodson | 248/121 |
| 8,632,037 | B1 | * | 1/2014 | Rael | 248/79 |

* cited by examiner

*Primary Examiner* — Christopher P Ellis
(74) *Attorney, Agent, or Firm* — Jonathan Rigdon Smith, PC; Jonathan R. Smith

(57) ABSTRACT

A hose holder for a boat, or for another object upon which contact with a hose is undesirable, is a shaped rigid rod provided with a means for suspending the rod close to its midpoint, the shape created by bending each end of the rod into a helix. The rod is smaller in diameter than a common garden hose. The helices have a common, horizontal axis with an inner diameter larger than such a hose. The means for suspending the rod is above the outer diameter of the helices. Other embodiments utilize non-helical rod shapes to support the hose.

22 Claims, 9 Drawing Sheets

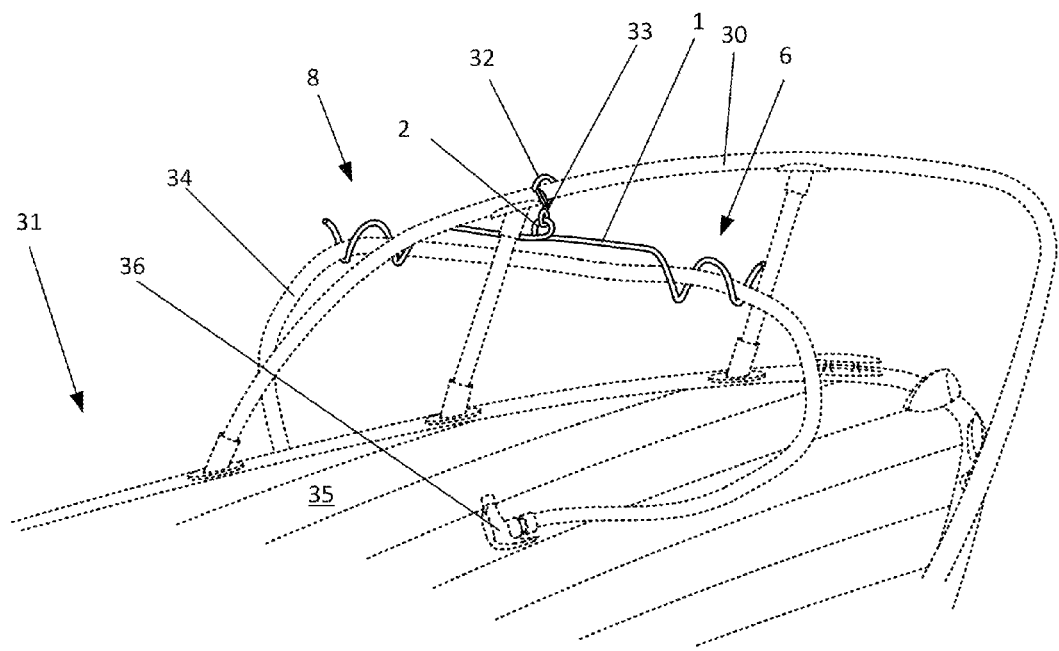
FIG. 3
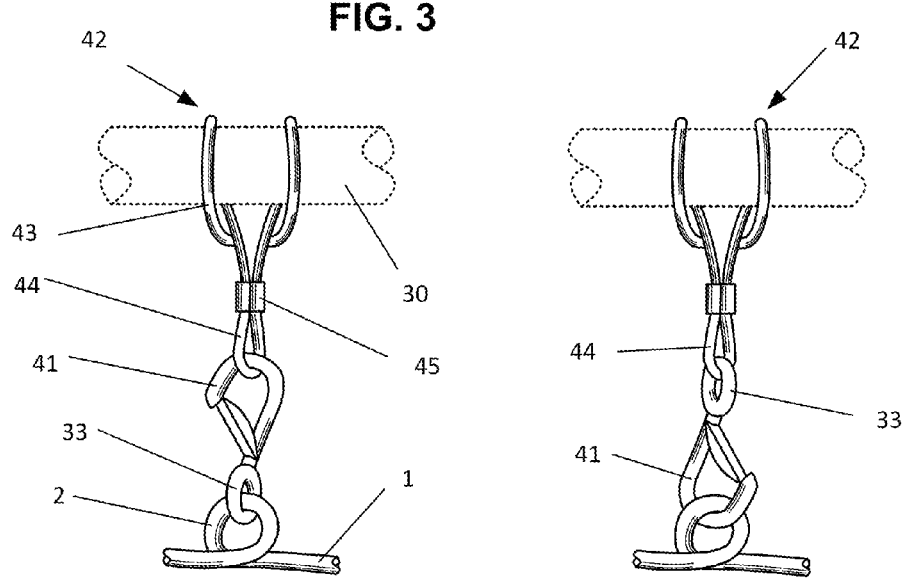
FIG. 4
FIG. 5

HOSE HOLDER AND METHOD

BACKGROUND OF INVENTION

Boat owners and operators frequently wash down boats and the equipment in them with water hoses. To do so, someone typically has to climb into or on top of the boat and pull the hose behind them. This usually results in the hose being dragged across a part of the boat, e.g., a railing or a gunwale. Hose surfaces often pick up dirt and sand during use, especially when they get wet, making them abrasive. As a result, unless great care is taken in moving a hose, it will abrade boat surfaces, damaging the finish. This may be accomplished by having another person hold the hose up or by throwing cloths over surfaces to protect them. Getting another person to hold the hose is inconvenient, and cloths can slip out from under a hose or abrade the surfaces themselves. There is a need for a convenient means for suspending a hose above boat surfaces during use, and it is the object of this invention to provide an apparatus for that purpose.

Another problem with using hoses on a boat, particularly a large boat on a trailer that can only be accessed by ladder, is that once the end of the hose is pulled up the ladder and onto the boat, the hose may slide off the boat if it is released by the user. The user must then climb down off the boat or enlist the help of someone else to retrieve it. It is therefore a further object of the invention to retard or prevent a hose from slipping out of reach when not held by a user.

Other objects of the instant invention will become evident in the following description and drawings.

BRIEF DESCRIPTION OF THE INVENTION

The instant invention is a shaped rigid rod provided with a means for suspending the rod close to its midpoint, the shape created by bending each end of the rod into a helix. The rod is smaller in diameter than a common garden hose. The helices have a common, horizontal axis with an inner diameter larger than such a hose. The means for suspending the rod is above the outer diameter of the helices. If the suspension means is flexibly attached to a point above the rod, the rod will hang below the suspension means in a substantially horizontal orientation because the suspension means is near the midpoint of the rod. A garden hose that is inserted through the helices will likewise hang in a substantially horizontal orientation and out of contact with surfaces below.

In the preferred embodiments, the helices at either end of the rod comprise about two turns, i.e., 720 degrees of rotation, and rotate in opposite senses from one another. In another embodiment, the invention further comprises a staff which can be inserted into a fishing rod holder or the like, the staff having an attachment point for the suspension means. Yet another embodiment of the invention has a suspension means consisting of a rigid clip of material having a much lower hardness than metal. Yet another embodiment has a suspension means comprising a polymeric strap or "cow" hitch engaged to a substantially horizontal rail, which a rigid clip interconnects to the midpoint of the shaped rod.

Another embodiment substitutes snap hooks suspended from the rod for the helices.

BRIEF DESCRIPTION OF THE DRAWINGS

FIG. 3 is a view of a second preferred embodiment attached to the bow railing of a boat.

FIG. 4 is a perspective view of a portion of a third preferred embodiment of the invention.

FIG. 5 is a perspective view of a portion of a fourth preferred embodiment of the invention.

DETAILED DESCRIPTION OF THE INVENTION

Figure 1:
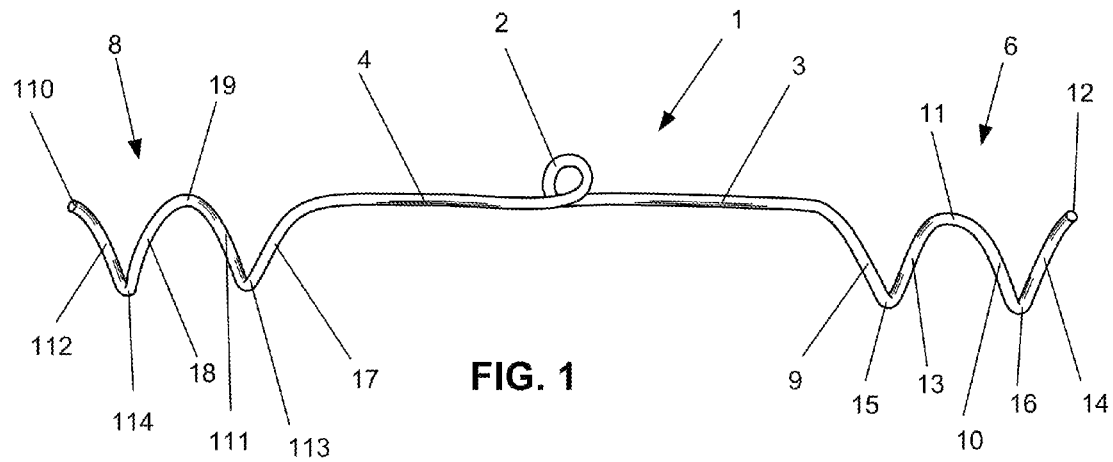
FIG. 1 is a front view of the first preferred embodiment of the instant invention.

FIG. 1 is a front view of the first preferred embodiment of the instant invention. It comprises a shaped rigid rod 1 having a smooth, substantially circular cross-section. The shape of the rod includes a means for suspending the rod near its midpoint, in this case a loop 2. The rod 1 extends rightward from the loop 2 in a first horizontal portion 3 and leftward in a second horizontal portion 4. The loop 2 extends above the horizontal portions. The right end of the rod 1 is formed into a right means for holding a hose, namely, a first helix 6, which is shown in this view to rotate beginning at the rightmost tip 12 downwardly and in a clockwise sense as seen from the right. The left end of the rod 1 is formed into a left means for holding a hose, namely, a second helix 8, which rotates beginning at the leftmost tip 110 downwardly and in a counterclockwise sense as seen from the left. Each helix preferably has two turns, thus giving the first helix 6 a first forward limb 9, a second forward limb 10, a first upper limb 11, a second upper limb 12, a first rearward limb 13, a second rearward limb 14, a first lower limb 15, and a second lower limb 16. Similarly, the second helix 8 has a third forward limb 17, a fourth forward limb 18, a third upper limb 19, a fourth upper limb 110, a third rearward limb 111, a fourth rearward limb 112, a third lower limb 113, and a fourth lower limb 114.

Figure 2:
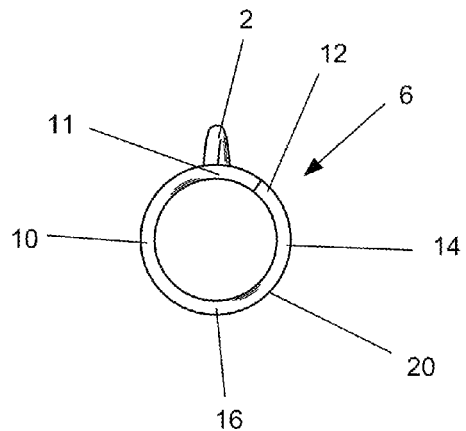
FIG. 2 is a right end view of the first preferred embodiment.

FIG. 2 is a right end view of the first preferred embodiment. The loop 2 and the first helix 6 are seen in this view, as also are the second forward limb 10, the second upper limb 12, the second rearward limb 14, and the second lower limb 16. The helices are shown here as a perfect circle 20 in end view but need not be so precisely formed to work. It is desirable that the inner diameter of the circle 20 be about 2 to 4 times the diameter of a garden hose, and that the pitch of the helices be approximately the same as their inner diameter.

FIG. 3 is a view of the second preferred embodiment attached to the bow railing 30 of a boat 31. (The railing and the boat are shown in dashed lines to indicate environmental structure.) In this second embodiment, the invention includes a non-abrasive hook 32 as a means for attaching the loop 2 to the railing 30. A ring 33 at the bottom of the hook 32 flexibly engages the loop 2 in the rod 1 of the invention. A garden hose 34 has been inserted through the first helix 6 and the second helix 8 of the rod 1. In this way, the hose 34 may be pulled through the helices without rubbing against the edge of the foredeck 35. Note also that the first helix 6 serves as a catch for the spray nozzle 36 in the event that the weight of the hose 34 tries to pull the hose overboard.

FIG. 4 shows the significant parts distinguishing a third preferred embodiment of the invention from that shown in FIG. 3. This third preferred embodiment comprises the shaped rod 1 and the means for suspending the rod, loop 2 of the preceding embodiments, and another means for attaching the loop 2 to the railing 30. Flexibly attached to the loop 2 by means of a ring 33 is a hook 41 which need not be a non-abrasive hook (see element 32 in FIG. 3). The hook 41 is used to grasp a non-abrasive hanger 42, which is used to form a strap (or "cow") hitch 43 over a railing 30. Preferably, the hanger 42 further comprises a bight 44 below the strap hitch 43 which is pinched off from the strap hitch 43 by a crimp 45, to provide an easy grasp point for the hook 41.

FIG. 5 depicts a fourth preferred embodiment in which the ring 33 is permanently looped through the bight 44, so that the hanger 42 and hook 41 are a permanent unit. It can be seen clearly that to place this means for attaching the loop 2 around the railing 30, the hook 41 and the bight 44 must be passed through the hitch 43 together.

Figure 6:
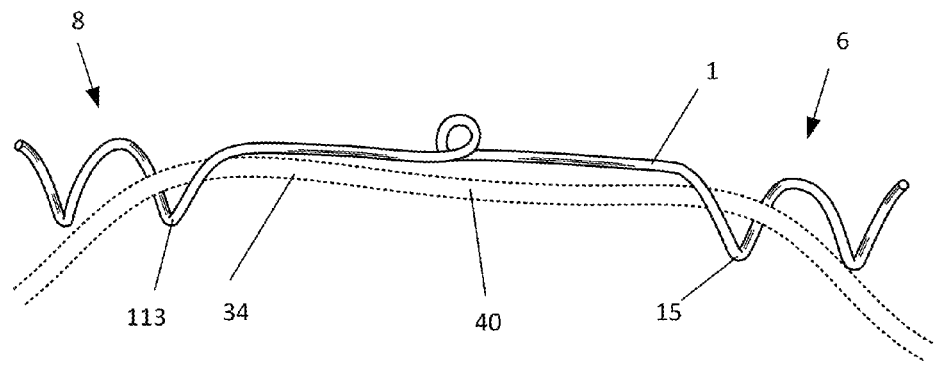
FIG. 6 is a front view of a portion of any of the four preferred embodiments showing the first step of positioning a hose in it.
Figure 7:
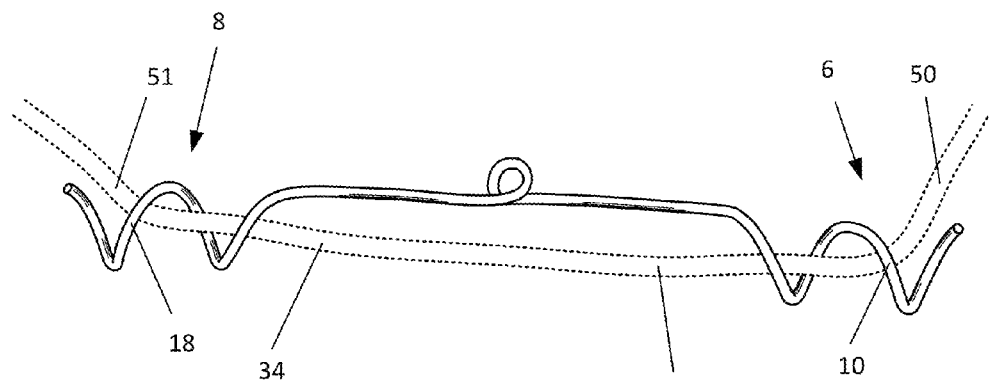
FIG. 7 is a front view of a portion of any of the four preferred embodiments showing the second step of positioning a hose in it.
Figure 8:
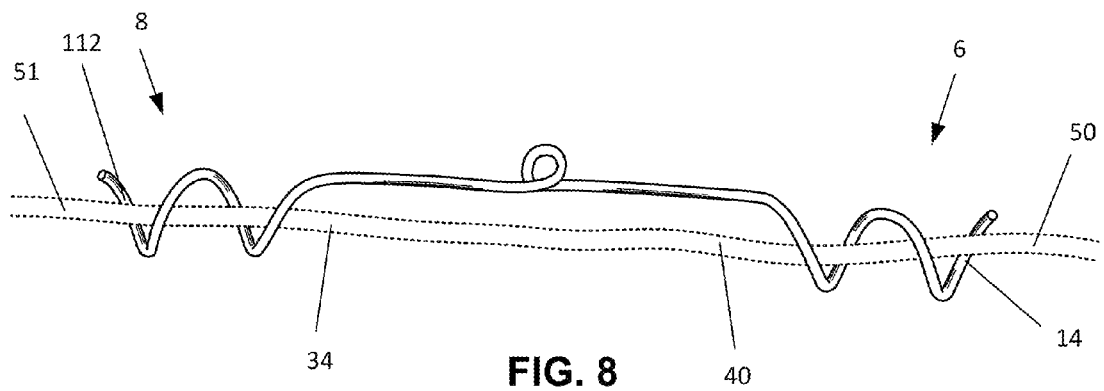
FIG. 8 is a front view of a portion of any of the four preferred embodiments showing the final step of positioning a hose in it.

FIGS. 6, 7 and 8 illustrate how a hose is placed in any of the first four preferred embodiments of the invention. A hose 34 (shown in dashed lines in the following illustrations to indicate environmental structure) may be placed in any of the foregoing preferred embodiments of the invention in three steps without having to thread one end of the hose through the helices. FIG. 6 is a front view of the rod 1 portion of the four preferred embodiments showing the first step of positioning a hose 34 in it, which involves dropping a section 40 of the hose 34 into the first lower limb 15 of the first helix 6 and the third lower limb 113 of the second helix 8, so that it rests substantially parallel to the rod 1.

The second step using the preferred embodiments of the invention is shown in FIG. 7. Here, the right end 50 of hose section 40 is raised to a position behind the second forward limb 10 of the first helix 6, and the left end 51 of the hose section 40 is raised to a position behind the fourth forward limb 18 of the second helix 8.

FIG. 8 shows the final step in placing the hose 34 in the preferred embodiments of the invention. The right end 50 of the hose section 40 is rotated forward and placed in front of the second rearward limb 14 of the first helix 6, and the left end 51 of the hose section 40 is rotated forward and placed in front of the fourth rearward limb 112 of the second helix 8.

Figure 9:
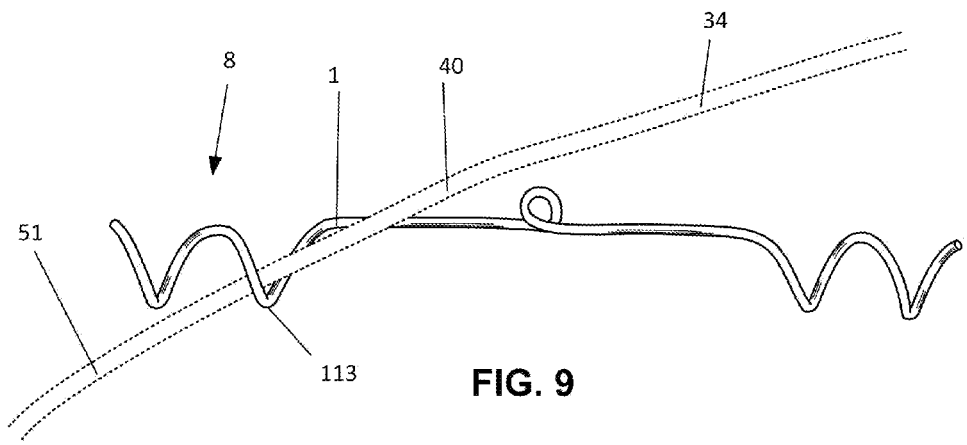
FIG. 9 is a front view of a fifth embodiment showing the first step of positioning a hose in it.

FIG. 9 is a front view of the rod 1 portion of a fifth embodiment showing the first step of positioning a hose in it. In this embodiment, note that the second helix 8 rotates in the same sense as the first helix 6 as seen from the ends (in contrast to the preferred embodiments, in which the helices rotate in opposite senses as seen from the ends). While this embodiment functions the same way as the preferred embodiments once a hose is placed in it, placing a section of hose in it is significantly more difficult. This is a seven-step process, with the first step illustrated in FIG. 9. Here, a section 40 of hose 34 is placed so that the left end 51 of hose section 40 rests on the third lower limb 113 of the second helix 8 of the rod 1.

Figure 10:
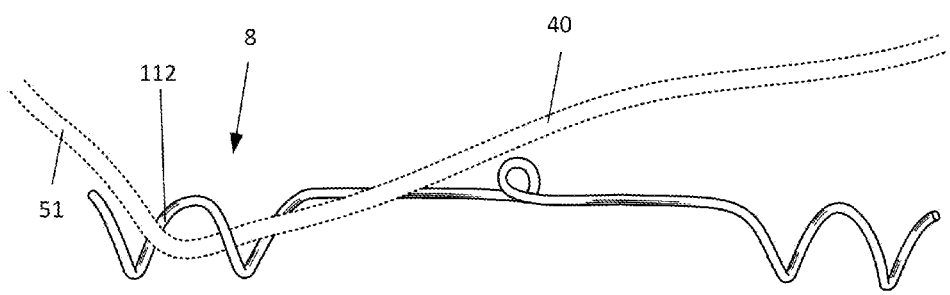
FIG. 10 is a front view of the fifth embodiment showing the second step of positioning a hose in it.

In FIG. 10, the second step involving the fifth embodiment, the left end 51 of the hose section 40 is lifted into position in front of the fourth rearward limb 112 of the second helix 8.

Figure 11:
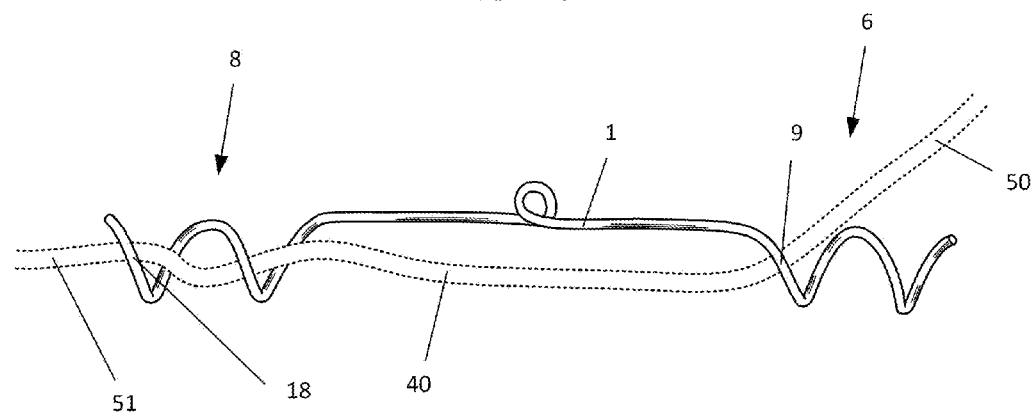
FIG. 11 is a front view of the fifth embodiment showing the third step of positioning a hose in it.

Next, FIG. 11 shows the third and fourth steps in this process. The third step is bringing the left end 51 of the hose section 40 down and behind the fourth forward limb 18 of the second helix 8. The fourth step is bringing the right end 50 of the hose section 40 down below the rod 1 and back up behind the first forward limb 9 of the first helix 6.

Figure 12:
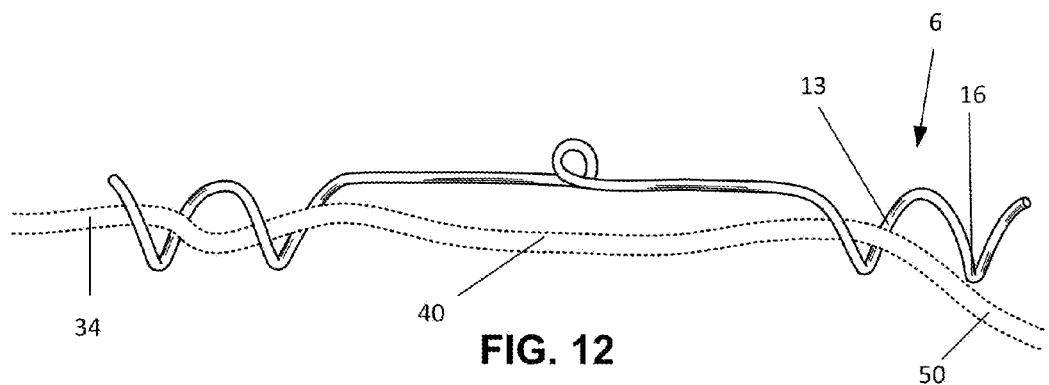
FIG. 12 is a front view of the fifth embodiment showing the fourth step of positioning a hose in it.

FIG. 12 is a front view of the fifth embodiment showing the fifth step of positioning the hose 34. Here, the right end 50 of the hose section 40 is brought down in front of the first rearward limb 13 of the first helix 6 and passed rearward under the second lower limb 16 of the first helix 6.

Figure 13:
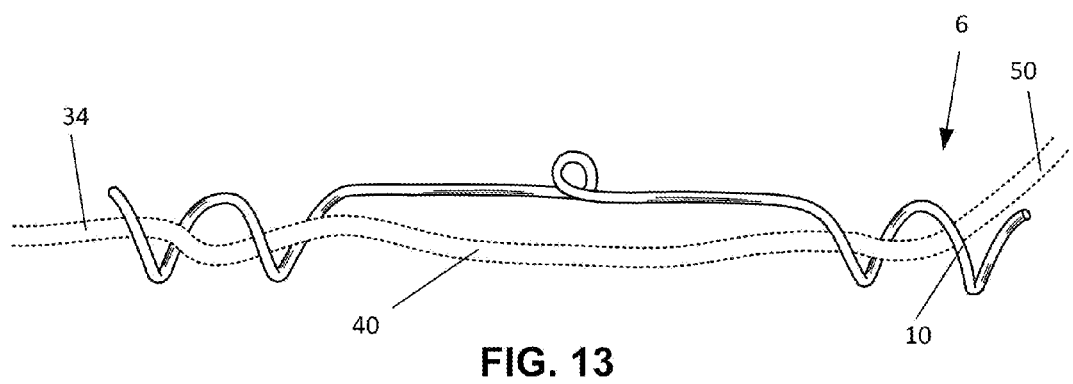
FIG. 13 is a front view of the fifth embodiment showing the fifth step of positioning a hose in it.

The sixth step in positioning the hose 34 in the fifth embodiment is shown in FIG. 13. Here, the right end 50 of the hose section 40 is brought up behind the second forward limb 10 of the first helix 6

Figure 14:
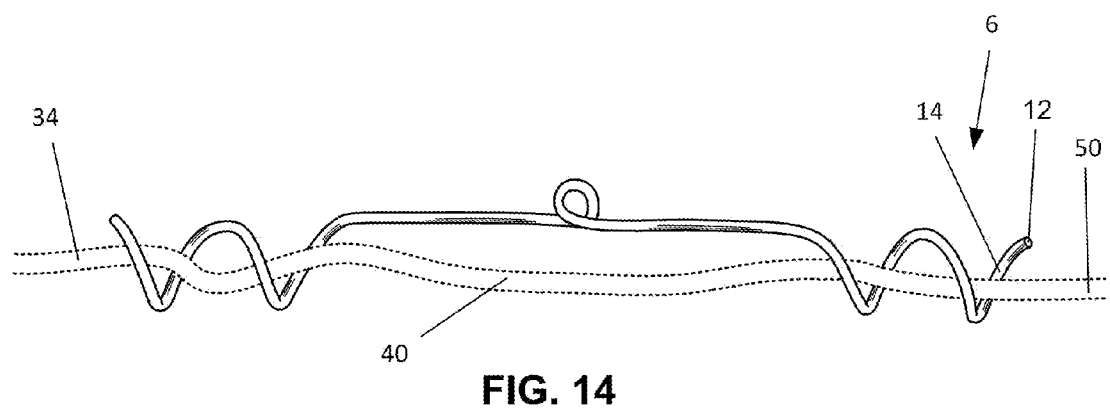
FIG. 14 is a front view of the fifth embodiment showing the sixth step of positioning a hose in it.

The seventh and final step in positioning the hose 34 in this embodiment is shown in FIG. 14, in which the right end 50 of hose section 40 is passed forward over the second upper limb 12 of the first helix 6 and brought down in front of the second rearward limb 14 of the first helix 6. It can be seen in this view that the hose 34 may now be slid to the right or left through the helices without obstruction.

It should be clear that the preferred embodiments are superior to this fifth embodiment in one way, namely, that they require fewer steps to ensconce a portion of the hose within the helical portions of the shaped rod 1. However, this fifth embodiment is, in another way, superior to the preceding embodiments in that it is radially symmetrical about the midpoint of the rod and therefore is not only balanced end to end but also will not tilt forwardly or backwardly when suspended from the midpoint.

Figure 15:
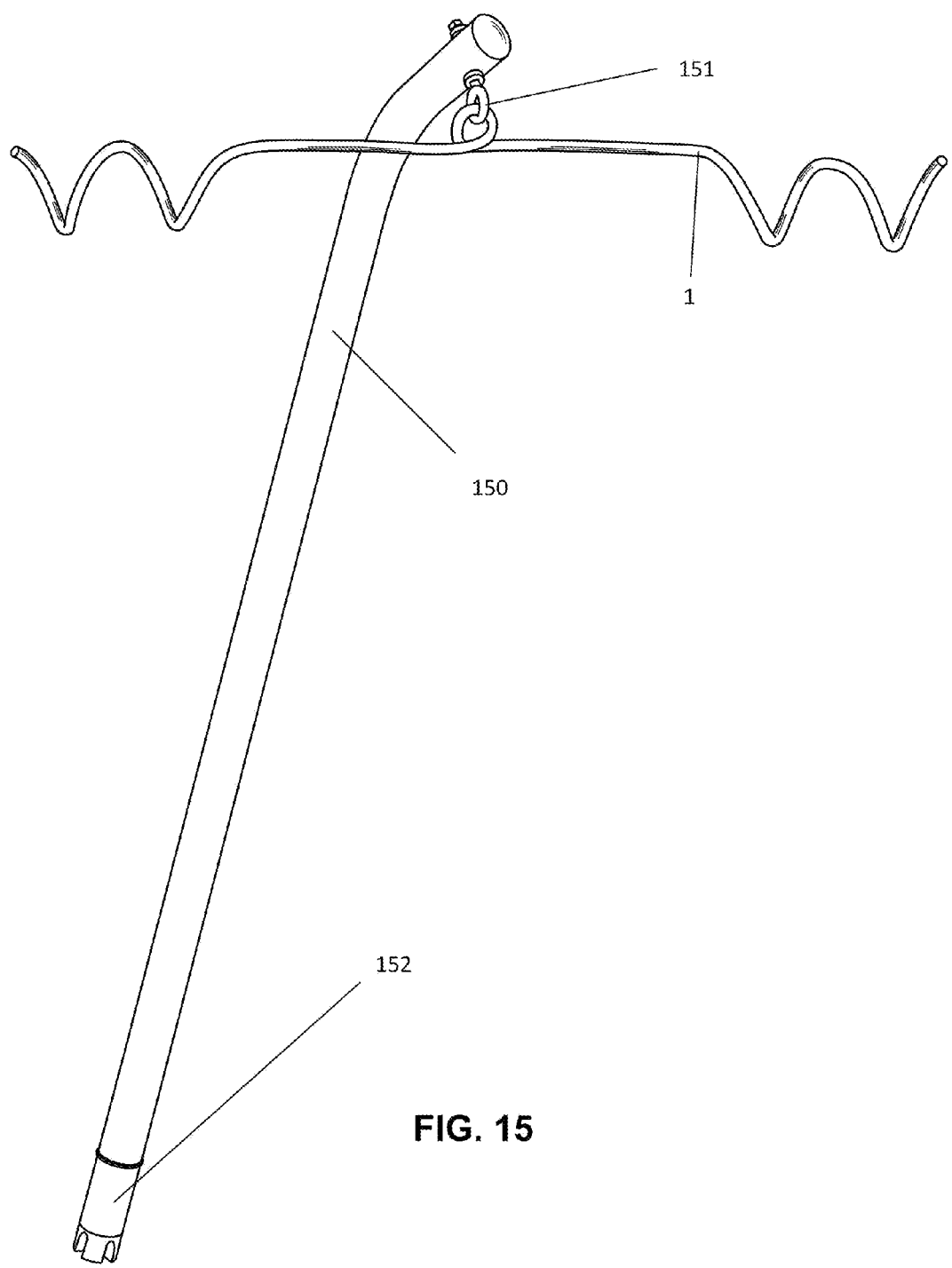
FIG. 15 is a perspective view of a sixth embodiment of the instant invention.

FIG. 15 is a perspective view of a sixth embodiment of the instant invention. Shaped rod 1 is flexibly suspended from a staff 150 by an eye bolt 151. The staff 150 is of a length sufficient to suspend a hose above a cylindrical cavity in a boat or other object. The staff 150 depicted here is equipped with a male gimbal fishing rod end 152 specially adapted to fit rotatably in a fishing rod holder (not shown in this view—see FIG. 17).

Figure 16:
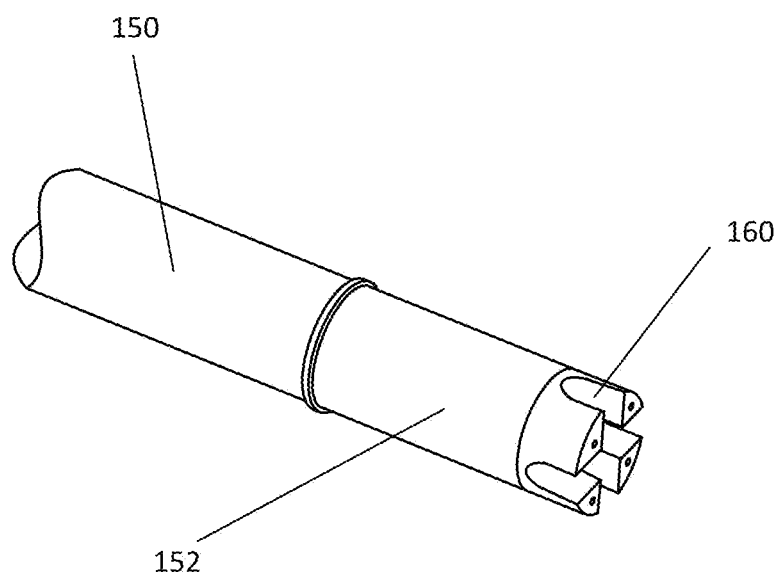
FIG. 16 is a perspective view of the rod holder end of the staff portion of the sixth embodiment.

FIG. 16 is a perspective view of the rod end 152 of the staff 150 of the sixth embodiment. Note the four obround cavities 160 which are shaped to engage pins within a typical fishing rod holder (see FIG. 17).

Figure 17:
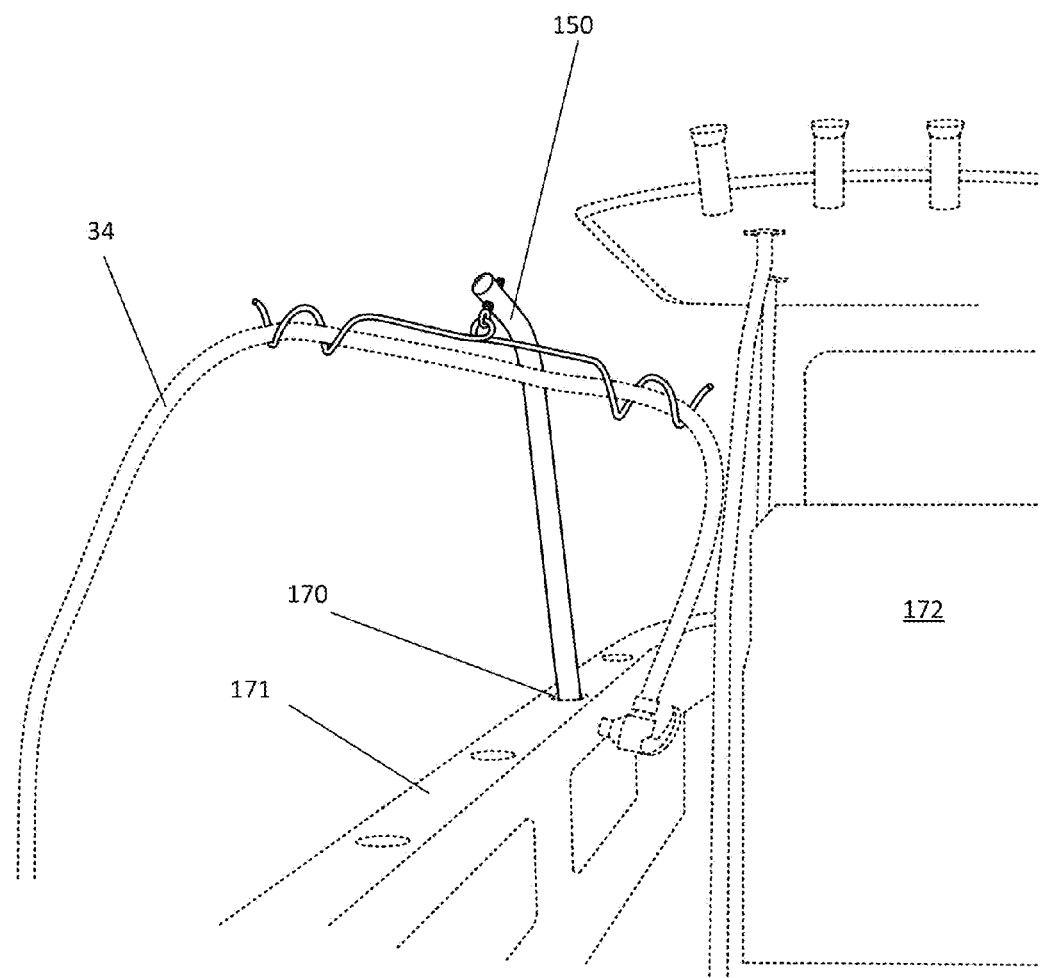
FIG. 17 is a perspective view of the sixth embodiment placed in a rod holder.

FIG. 17 is a perspective view of the staff 150 of the sixth embodiment placed in a typical fishing rod holder 170 located on a gunwale 171 of a boat 172. A hose 34 held by this embodiment stays well clear of the gunwale 171. (The boat 172 and appurtenances and the hose 34 are shown in dashed lines as environmental structure.)

Figure 18:
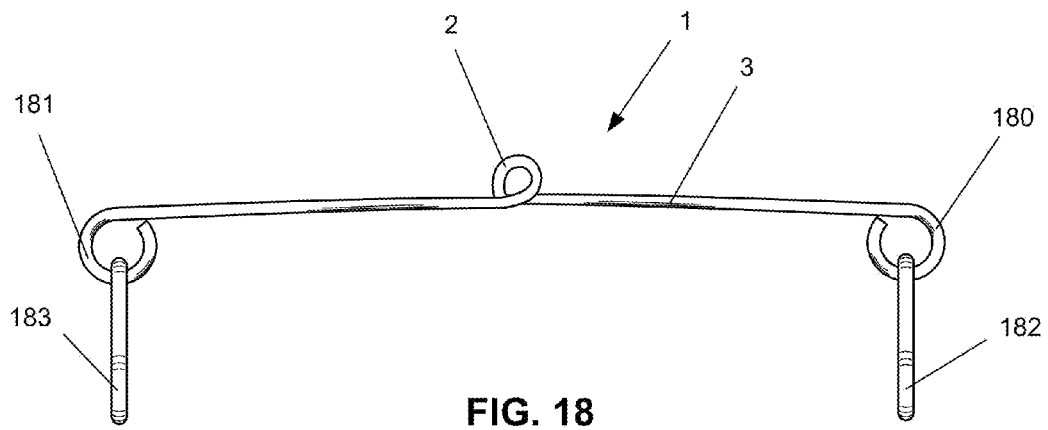
FIG. 18 is a front view of a seventh embodiment of the invention.

FIG. 18 is a front view of a seventh embodiment of the present invention, in which the right and left ends of the shaped rod 1 are formed into right eye 180 and left eye 181 instead of the helices shown in the preceding figures, and the right and left means for holding a hose are a right snap hook 182 and a left snap hook 183. These snap hooks are typically formed from steel rod material of round cross-section, and have a spring-loaded snap portion along one side.

Figure 19:
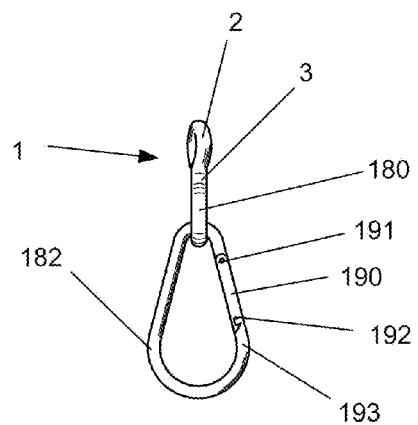
FIG. 19 is a side view of the seventh embodiment.

FIG. 19 is a side view of this seventh embodiment, showing the snap portion 190 of the right snap hook 182. The snap portion 190 pivots about a hinge 191 with a spring bias tending to latch the snap portion bottom end 192 in line with the curved portion 193 of the snap hook 182. To use this embodiment, a section of hose can be pushed into engagement with each snap hook by pressing the hose against the snap portion of each snap hook to open it. Once the hose is past the snap portion, the snap portion springs back into alignment with the rest of the snap hook so that the hose cannot become dislodged from the hook until the user intends to remove the hose from the snap hook.

The invention claimed is:

1. A hose holder, comprising:
an elongate, shaped rod having
a straight middle portion having a horizontal middle axis, a right end, and a left end;
the right end comprising a right means for slidably holding a hose and the left end comprising a left means for slidably holding the same hose so that the section of the hose between the right end and the left end is substantially parallel to the straight middle portion; and
a means for suspending the rod positioned above the middle axis and substantially at the midpoint of the straight middle portion.

2. The hose holder of claim 1, in which:
said right means for slidably holding the hose comprises
a right eye having a periphery extending below said middle axis and in a vertical plane substantially coincident with said middle axis;
a right snap hook suspended below the eye;
said left means for slidably holding the hose comprises
a left eye having a periphery extending below said middle axis and in a vertical plane substantially coincident with said middle axis; and
a left snap hook suspended below the left eye.

3. The hose holder of claim 1, in which:
an elongate, shaped rod having
said right means for slidably holding the hose is formed into a first helix;
the first helix having a first helix axis, a first direction of rotation, a first number of rotations, a first pitch, and a first inner diameter;
said left means for slidably holding the hose is formed into a second helix;
the second helix having a second helix axis, a second direction of rotation, a second number of rotations, a second pitch, and a second inner diameter;
the first helix axis and the second helix axis being substantially parallel to and below said horizontal middle axis.

4. The hose holder of claim 3, in which:
said first helix axis and said second helix axis are substantially collinear;
said first number of rotations equals said second number of rotations; and
said first pitch, said second pitch, said first inner diameter and said second inner diameter are all substantially equal in length.

5. The hose holder of claim 4, in which:
said first number of rotations is approximately two; and
said second number of rotations is approximately two.

6. The hose holder of claim 5, in which:
said first direction of rotation as seen from said right end of said rod is opposite to said second direction of rotation as seen from said left end of said rod.

7. The hose holder of claim 6, in which:
said first helix has a first forward limb, a second forward limb, a first upper limb, a second upper limb, a first rearward limb, a second rearward limb, a first lower limb, and a second lower limb; and
said second helix has a third forward limb, a fourth forward limb, a third upper limb, a fourth upper limb, a third rearward limb, a fourth rearward limb, a third lower limb, and a fourth lower limb.

8. The hose holder of claim 2 or claim 3, further comprising:
a means for flexibly attaching said means for suspending said rod to an elongate part of an object.

9. The hose holder of claim 8, in which:
said means for flexibly attaching is a hook for clasping said elongate part.

10. The hose holder of claim 9, in which:
said means for suspending said rod is a 360-degree loop in said rod.

11. The hose holder of claim 8, in which:
said means for flexibly attaching is a hitch placed about said elongate part and flexibly attached to a hook made of any material.

12. The hose holder of claim 11, in which:
said hitch comprises a flexible loop;
the loop having a periphery; and
a bight fixed to a point along the periphery.

13. The hose holder of claim 12, in which:
said hook made of any material consists of a removable snap end and a ring end;
the ring end having a ring affixed thereto;
said bight passing non-removably through the ring.

14. The hose holder of claim 13, in which:
said means for suspending said rod is a 360-degree loop in said rod.

15. The hose holder of claim 2 or claim 3, further comprising:
a means for suspending said rod above a substantially vertical cavity in an object.

16. The hose holder of claim 15, in which:
said means for suspending said rod is an elongate substantially vertical staff;
the vertical staff having an upper end and a lower end;
the upper end comprising a means for flexibly attaching said means for suspending said rod; and
the lower end fitting into said vertical cavity.

17. The hose holder of claim 16, in which:
said means for flexibly attaching said means for suspending said rod comprises a hook made of any material depending from an eye bolt.

18. The hose holder of claim 17, in which:
said lower end comprises a fishing rod end; and
said substantially vertical cavity is a fishing rod holder.

19. The hose holder of claim 18, in which:
said means for suspending said rod is a 360-degree loop in said rod.

20. A method of inserting a section of hose having a right hose section end and a left hose section end into the hose holder of claim 7, comprising the steps of:
(a) dropping the section of hose into said first lower limb of said first helix and said third lower limb of said second helix so that the section of hose rests substantially parallel to said straight middle portion of said rod;
(b) raising the right hose section end to a position behind said second forward limb of said first helix, and raising the left hose section end to a position behind said fourth forward limb of said second helix; and (c) rotating the right hose section end forward, placing it in front of said second rearward limb of said first helix, and rotating the left hose section end forward, and placing it in front of said fourth rearward limb of said second helix.

21. A method of holding a hose above an object after insertion of the hose into the hose holder of claim 12, comprising the steps of:
(a) locating said elongate part of the object;
(b) making a strap hitch about said elongate part out of said loop by placing said loop around said elongate part and passing said bight completely through said loop; and
(c) connecting said suspension means to said bight with said hook made of any material.

22. A method of holding a hose above an object after insertion of the hose into the hose holder of claim 12, comprising the steps of:
(a) locating said elongate part of the object;
(b) making a strap hitch about said elongate part out of said loop by placing said loop around said elongate part and passing said bight and said hook completely through said loop; and
(c) connecting said snap end of said hook to said means for suspending said rod.

\* \* \* \* \*